United States Patent [19]

Narabu et al.

[11] Patent Number: 5,303,052
[45] Date of Patent: Apr. 12, 1994

[54] CCD SOLID-STATE PICKUP DEVICE WITH CONTROLLED SHUTTER PULSE GENERATION

[75] Inventors: Tadakuni Narabu; Hisanori Miura; Maki Sato, all of Kanagawa, Japan

[73] Assignee: Sony Corporation, Tokyo, Japan

[21] Appl. No.: 98,755

[22] Filed: Jul. 29, 1993

Related U.S. Application Data

[63] Continuation of Ser. No. 890,005, May 29, 1992, abandoned.

[30] Foreign Application Priority Data

May 30, 1991 [JP] Japan ................................ 127832

[51] Int. Cl.$^5$ .............................................. H04N 5/335
[52] U.S. Cl. ........................................ 348/299; 348/230
[58] Field of Search ................. 358/213.11, 213.13, 358/213.19, 213.28, 213.29, 443; 250/578.1; H04N 5/335

[56] References Cited

U.S. PATENT DOCUMENTS

| | | | |
|---|---|---|---|
| 4,479,062 | 10/1984 | Kawasaki et al. | 250/578.1 |
| 4,623,927 | 11/1986 | Hoshino | 358/213.19 |
| 4,635,126 | 1/1987 | Kinoshita | 358/228 |
| 4,984,002 | 1/1991 | Kokubo | 358/213.13 |

FOREIGN PATENT DOCUMENTS 62-166661  7/1987  Japan ..................... H04N 5/335

Primary Examiner—Joseph Mancuso
Assistant Examiner—Tuan V. Ho
Attorney, Agent, or Firm—Hill, Steadman & Simpson

[57] ABSTRACT

A CCD solid-state image pickup device includes a CCD solid-state image pickup element which includes a sensor array comprising a number of one-dimensionally arranged photosensitive units, a read-out gate, a transfer register and electronic shutter means comprising a drain gate and a drain region, the read-out gate and the transfer register being disposed at one side of the sensor array and the electronic shutter means being disposed at the other side of the sensor array, an output level comparator for comparing the output level of each image pickup signal from the CCD solid-state image pickup element with the output level of a predetermined reference signal to output a comparison signal, and a shutter-timing generating unit for generating an output timing of a shutter pulse for a predetermined period on the basis of the comparison signal from the output level comparator, and supplying the shutter pulse to the electronic shutter means of the CCD solid-state image pickup element at the generated output timing.

5 Claims, 3 Drawing Sheets

CCD SOLID-STATE PICKUP DEVICE WITH CONTROLLED SHUTTER PULSE GENERATION

This is a continuation of application Ser. No. 07/890,005, filed May 29, 1992, now abandoned.

BACKGROUND OF THE INVENTION

1. Field of the Invention

This invention relates to a CCD solid-state image pickup device, and particularly to a CCD solid-state image pickup device in which a charge accumulation time of a photosensitive unit is adjustable.

2. Prior Art

In general, a CCD (charge-coupled device) solid-state image pickup device such as a linear sensor (one-dimensional image sensor) comprising an array of plural photosensitive units which are one-dimensionally arranged has been frequently used in an image input portion of a facsimile machine, an image scanner, a digital copying machine or the like.

A representative conventional linear sensor is shown in FIG. 4. As shown in FIG. 4, the conventional linear sensor includes a sensor array 22 comprising a number of one-dimensionally arranged photosensitive units each of which comprises a photodiode for accumulating charges in accordance with an incident light thereto, a read-out gate 23 disposed at one side of the sensor array 22 and a transfer register 24 for receiving the accumulated charges from the photosensitive units through a switching operation of the read-out gate 23. The transfer register 24 is disposed at the one side of the sensor array such that the read-out gate 23 is positionally interposed between the sensor array 22 and the transfer register 24.

The following signal output operation is carried out in the conventional CCD solid-state image pickup device thus constructed. A read-out pulse $\phi r$ is supplied to the read-out gate 23 during a read-out period to read out a signal charge accumulated in each photosensitive unit of the sensor array 22 and transfer it through the read-out gate 23 to the transfer register 24. Thereafter, during a transfer period, the transfer register 24 is supplied with two-phase clock pulses $\phi 1$ and $\phi 2$ having opposite phases so that each signal charge is transferred unidirectionally (in a direction as indicated by an arrow) and passed through an FDA (floating diffusion amplifier) 25 which are disposed at the rear stage of the transfer register 24, thereby converting each of the signal charges to a voltage signal one by one.

As one of video cameras having a number of sensor arrays is known a video camera which is equipped with an overflow drain and an overflow control gate at one side of each sensor array to have an electronic shutter function.

Such a video camera is disclosed, for example, in Japanese early Published (Not Examined) Patent No. P62-166661.

However, the conventional CCD solid-state image pickup device such as a linear sensor has a disadvantage that an output level thereof is varied even for the same subject (original) in accordance with luminosity change of a light source. That is, in a facsimile machine or a digital copying machine, a fluorescent lamp is usually used as a light source to read out an image on an original, but the fluorescent lamp is liable to be largely varied in luminosity with time lapse. Therefore, the output level which was obtained at an initial stage by reading out an image on an original is not obtained after a time elapses from the initial stage.

Further, when a scan speed of the linear sensor to the original is varied by fluctuated, the output level is also varied or fluctuated, the output level is also varied in accordance with variation or fluctuation of the scan speed.

In order to overcome the above disadvantages, for example, it is proposed to install an AGC (automatic gain control) circuit into the linear sensor. However, in this case, there occurs a new disadvantage that a noise component is liable to be mixed and the signal-to-noise ratio (S/N) of an image pickup signal from the linear sensor is degraded.

SUMMARY OF THE INVENTION

An object of this invention is to provide a CCD solid-state image pickup device in which an invariable output level can be obtained irrespective of the variation in luminosity of a light source with time lapse and the variation or fluctuation of a scan speed, and a signal-to-noise ratio (S/N) is stably obtained without being varied from its initial state.

In order to attain the above object, a CCD solid-state image pickup device according to this invention includes a CCD solid-state image pickup element which includes a sensor array comprising a number of one-dimensionally arranged photosensitive units, a read-out gate, a transfer register and electronic shutter means comprising a drain gate and a drain region, the read-out gate and the transfer register being disposed at one side of the sensor array and the electronic shutter means being disposed at the other side of the sensor array, an output level comparator for comparing the output level of each image pickup signal So from the CCD solid-state image pickup element with the output level of a predetermined reference signal Sr, and a shutter-timing generating unit for generating an output timing of a shutter pulse p for a predetermined period (dummy transfer period t2) on the basis of the comparison result S from the output level comparator, and supplying the shutter pulse p to the electronic shutter means of the CCD solid-state image pickup element at the generated output timing.

According to the CCD solid-state image pickup device thus constructed, the output level of the image pickup signal So from the CCD solid-state image pickup element is compared with the output level of the reference signal Sr, and the output timing of the shutter pulse p to be applied to the electronic shutter means can be changed on the basis of the comparison result S. Therefore, the charge accumulation time t3 in the photosensitive units can be controlled such that the time t3 is shortened when the luminosity of a light source is higher, while the time t3 is lengthened when the luminosity of the light source is lower. Accordingly, even if the luminosity of the light source is reduced with time lapse, the output level of the image pickup signal So at any time is constantly equalized to that at the initial stage.

In addition, even if the scan speed of a linear sensor to an original (subject) is varied or fluctuated, a constant output level can be stably obtained by adjusting the charge accumulation time t3.

DETAILED DESCRIPTION OF THE INVENTION

An embodiment of this invention will be hereunder described with reference to FIGS. 1 through 3.

Figure 1:
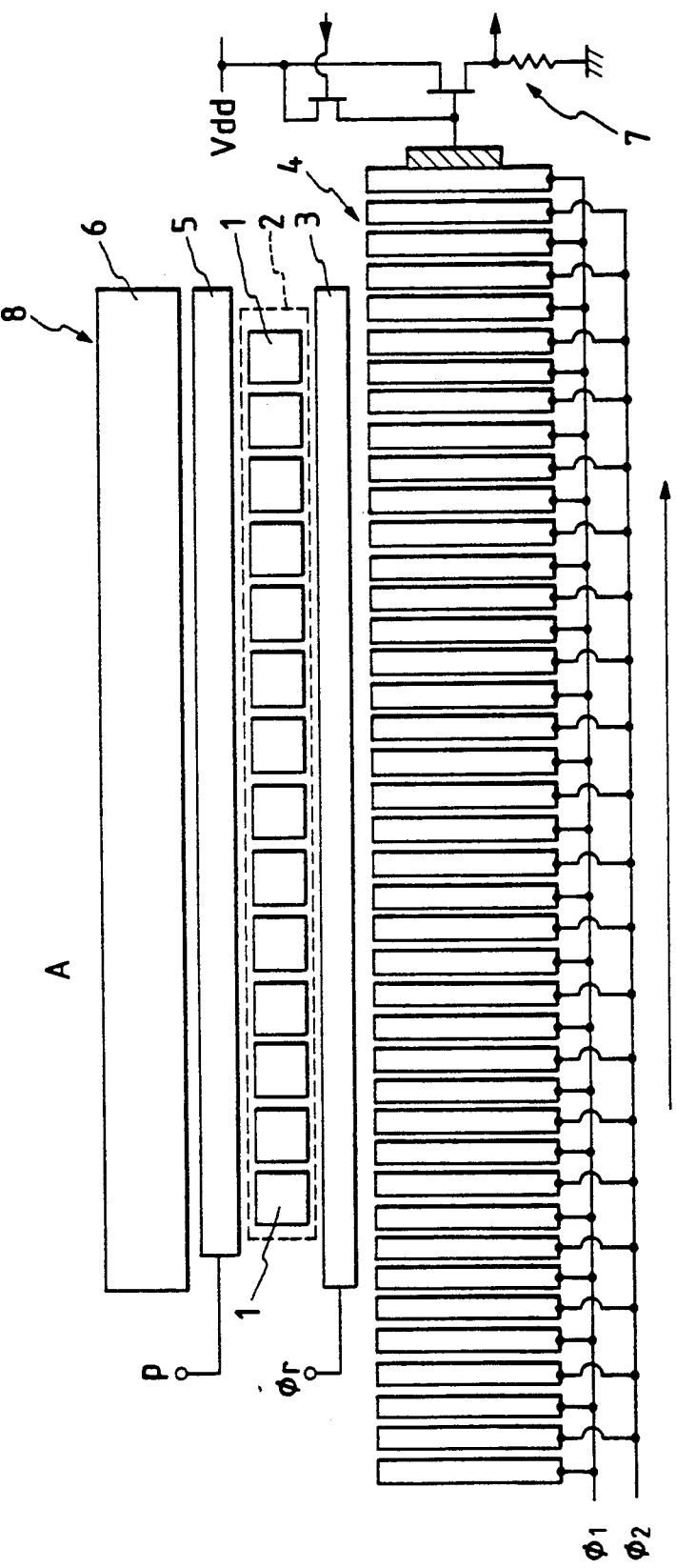
FIG. 1 is a schematic diagram showing a CCD solid-state image pickup element installed in a linear sensor according to this invention.

FIG. 1 is a schematic diagram showing an embodiment of an CCD solid-state image pickup element which is installed in a linear sensor.

The CCD solid-state image pickup element A of this embodiment includes a sensor array comprising a number of photosensitive units which are one-dimensionally arranged. Each of the photosensitive units comprises a photodiode which is formed of a PN junction of different conducting types of impurity diffusion regions. The CCD solid-state image pickup element A is further equipped with a read-out gate 3 which is continuously formed at one side of the sensor array 2 along an arranging direction of the photosensitive units 1, a transfer register 4 comprising a CCD which is disposed at such a position that the read-out gate 3 is positionally interposed between the sensor array 2 and the transfer register 4 at the one side of the sensor array 2, a drain gate 5 which is continuously formed at the other side of the sensor array 2 along the arranging direction of the photosensitive units 1, and a wide drain region 6 which is disposed in such a position that the drain gate 5 is positionally interposed between the sensor array 2 and the drain region 6 at the other side of the sensor array 2.

Figure 3:
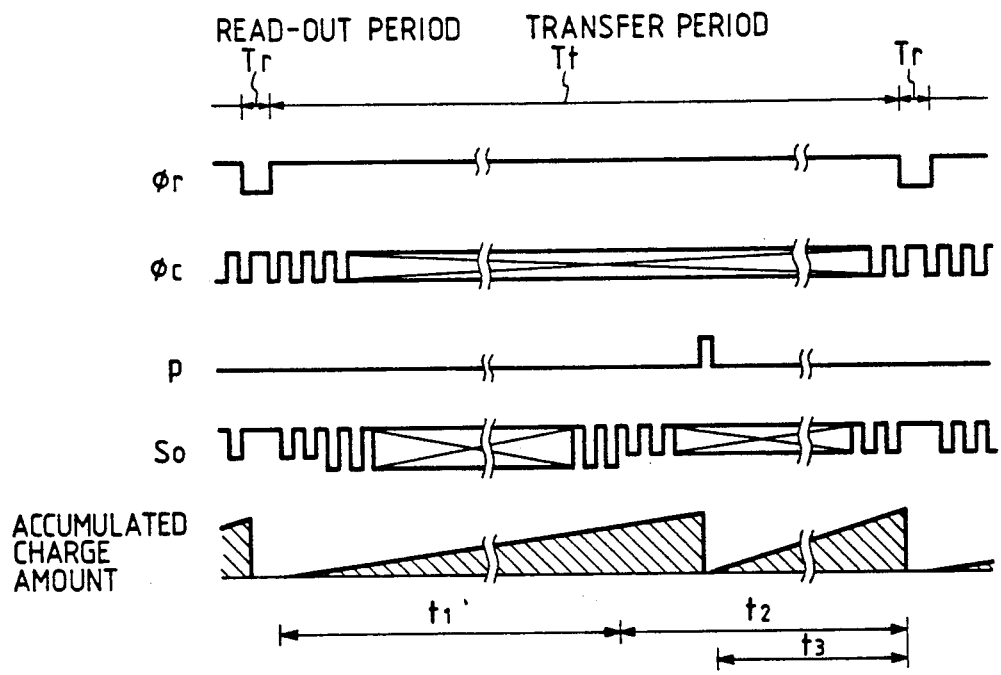
FIG. 3 is chart for an operation of the linear sensor to this invention.
Figure 4:
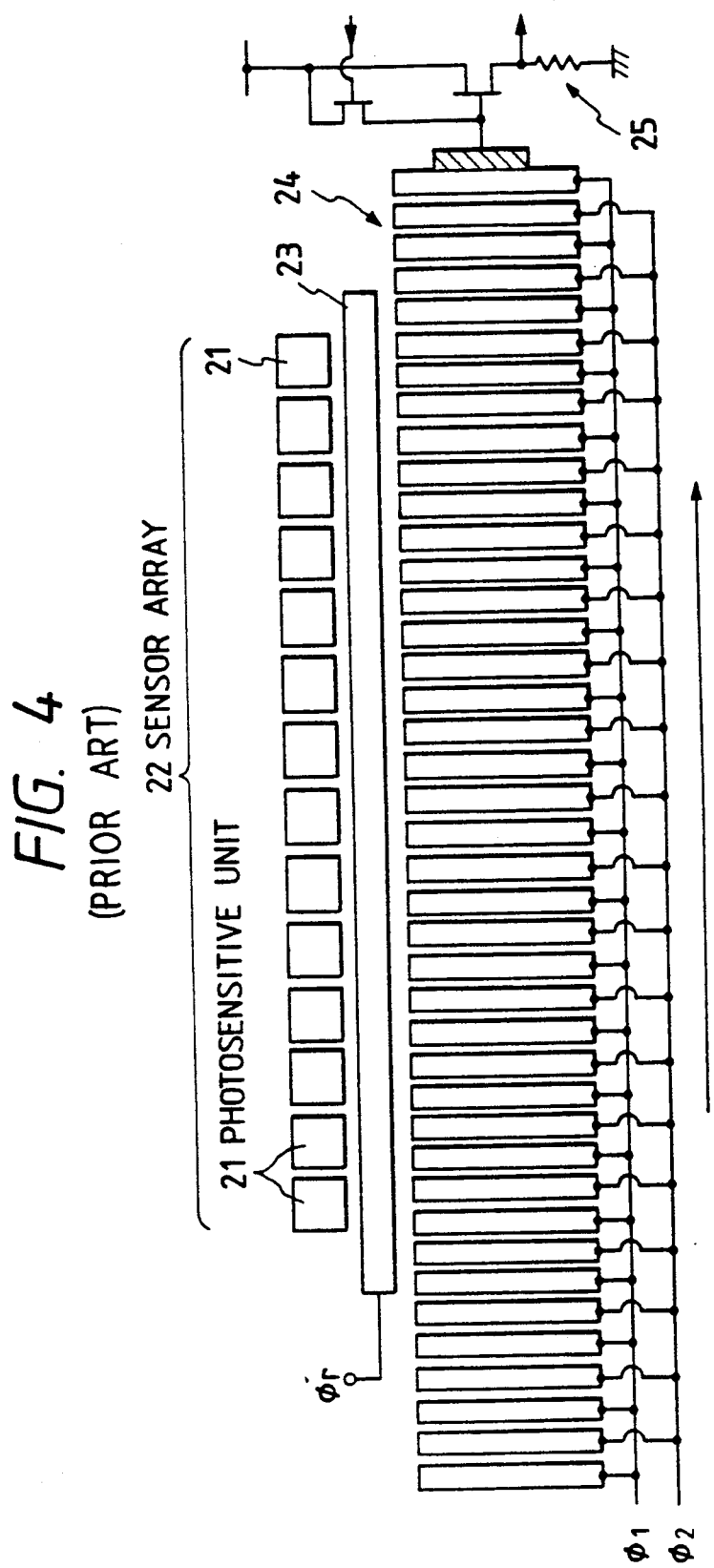
FIG. 4 is a schematic diagram showing a CCD solid-state image pickup element installed in a conventional linear sensor.

FIG. 3 is a time chart for an operation of this embodiment. During a read-out period Tr as shown in FIG. 3, a read-out pulse $\phi r$ is supplied to the read-out gate 3 to read out a signal charge accumulated in each photosensitive unit 1 of the sensor array 2 to the transfer register 4 through the read-out gate 3, and then during a transfer period Tt two-phase clock pulses $\phi 1$ and $\phi 2$ having opposite phases are supplied to the transfer register 4 to transfer each signal charge unidirectionally (in a direction indicated by an arrow) and pass it through an FDA (floating diffusion amplifier) 7 which are disposed at the rear stage of the transfer register 4, whereby the transferred signal charge is converted to a voltage and outputted as an image pickup signal.

Through the above operation, the output of effective picture elements is carried out during an effective picture-element output period t1, and then the dummy output is carried out during a dummy transfer period t2. At the same time, a subsequent signal charge is accumulated in each photosensitive unit 1 during the transfer period Tt. In this embodiment, a pulse p is supplied to the drain gate 5 within the dummy transfer period t2 to discharge the signal charge accumulated in the photosensitive unit 1 to the drain region 6 through the drain gate 5. In response to the trailing edge of the pulse p, the charge accumulating operation of each photosensitive unit 1 is reopened. This charge accumulating operation is continued until a next read-out pulse $\phi r$ is input to the read-out gate 3.

Therefore, the actual charge accumulation time t3 is a period between the trailing edge of the pulse p and the input of the next read-out pulse $\phi r$. Accordingly, the drain gate 5 and the drain region 6 serve as an electronic shutter means 8 of the CCD solid-state image pickup element A in combination, and the pulse p serves as a shutter pulse for the electronic shutter means 8.

Figure 2:
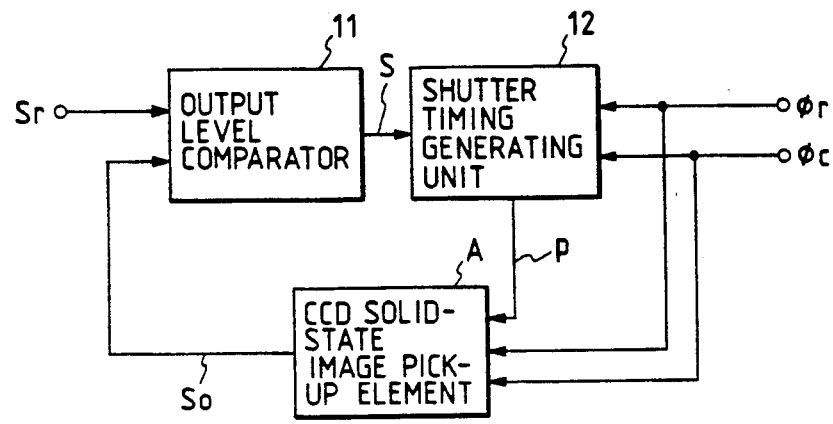
FIG. 2 is a schematic diagram showing the linear sensor according to this invention.

The linear sensor (CCD solid-state image pickup device) according to this invention is constructed by an assembly of the CCD solid-state image pickup element A as described above, an output level comparator 11 and a shutter timing generating unit 12 as shown in FIG. 2.

The output level comparator 11 receives an image pickup signal So from the CCD solid-state image pickup element A and a reference signal Sr inputted through another input passageway to compare the output levels of the signals So and Sr and output the comparison result as a comparison signal S. The reference signal Sr is set to a value which corresponds to the optimum output of the linear sensor. The output level comparator 11 outputs, for example, a high-level comparison signal S when the output level of the image pickup signal So is larger than the output level of the reference signal Sr, while it outputs a low-level comparison signal S when the output level of the image pickup signal So is lower than the output level of the reference signal Sr.

The shutter timing generating unit 12 is connected to a known programmable counter whose count value is decremented every input of a main clock pulse $\phi c$. The programmable counter is so designed that a shutter pulse p is outputted when its count value becomes zero, and in response to input of a read-out pulse $\phi r$ the count value returns to a set value (initial value) before subjected to the decremental operation. In a manufacturing process of the linear sensor, an optimum count value corresponding to the output timing of a shutter pulse for the electronic shutter means 8 of the CCD solid-state image pickup element A is beforehand set in the counter.

As shown in the time chart of FIG. 3, the output timing of the shutter pulse p is set to such a value that the shutter pulse p is outputted within the dummy transfer period t2 of the effective picture-element output period t1 and the dummy transfer period t2 in the transfer period Tt, and is determined on the basis of the comparison signal S from the output level comparator 11 in the shutter timing generating unit 12 of the linear sensor.

That is, when the comparison signal S of the output level comparator 11 is high (for example, when the output level of the image pickup signal So of the CCD solid-state image pickup element A is larger than that of the reference signal Sr due to high luminosity of the light source), a value in the counter is set to a value larger than the set value thereof. By the manner as described above, the output timing of the shutter pulse p is shifted to a next read-out period Tr side, so that the charge accumulation time t3 is shortened, and the output level of the image pickup signal So is reduced.

Conversely, when the comparison signal S of the output level comparator 11 is lower (for example, when the luminosity of the light source is weakened with time lapse and the output level of the image pickup signal So from the CCD solid-state image pickup element A is lower than that of the reference signal Sr), the value in the counter is set to a value lower than the set value thereof. By the manner as described above, the output timing of the shutter pulse p is shifted to the effective picture-element output period t1 side, so that the charge accumulation period t3 is lengthened, and the output level of the image pickup signal So is intensified.

Particularly, by performing the adjustment of the output level of the image pickup signal So at the time when a set power source of the linear sensor is switched on, the reduction of the output level of the image pickup signal So due to the time-variation in luminosity of the light source is prevented, and thus the output level of the linear sensor can be stably fixed within a predetermined range. In addition, unlike a manner of controlling the amplitude of an image pickup signal with an AGC, a noise component is restricted to be constant, and the sensitivity of the linear sensor can be corrected without degradation of signal-to-noise ratio.

As described above, according to this invention, the output level of the image signal So from the CCD solid-state image pickup element A is compared with the output level of the reference signal Sr to change the output timing of the shutter pulse p to be supplied to the electronic shutter means 8 on the basis of the comparison result S, so that the charge accumulation time t3 in each photosensitive unit is shortened when the luminosity of the light source is higher, while the charge accumulation time t3 in each photosensitive unit is lengthened when the luminosity of the light source is lower. Therefore, even if the luminosity of the light source is reduced with time lapse, the output level of the image pickup signal So is stably fixed to that at the initial stage.

In addition, even if the scan speed of the linear sensor to a subject (an original) is varied or fluctuated, the adjustment of the charge accumulation time t3 enables an output level to be constant.

According to the CCD solid-state image pickup device of this invention, an image pickup signal having a constant output level can be obtained irrespective of the time-variation of the luminosity of the light source and the variation or fluctuation of the scan speed, and a constant signal-to-noise ration can be obtained without being varied from the initial value thereof.

What is claimed is:

1. A CCD solid-state image pickup device comprising:

a CCD solid-state image pickup element including a sensor array comprising a number of one-dimensionally arranged photosensitive units for accumulating a charge therein, a read-out gate to which a read-out pulse is applied during a read-out period so that said charge is read-out, a transfer register to which said charge is transferred during a transfer period following said read-out period and electronic shutter means comprising a drain gate and a drain region, said read-out gate and said transfer register being disposed at one side of said sensor array and said electronic shutter means being disposed at the other side of said sensor array;

a comparator for comparing the output level of each image pickup signal with a predetermined reference signal to output a comparison signal; and a shutter-timing generating unit connected to said comparator for generating an shutter pulse in response to said comparison signal from said comparator, and supplying the shutter pulse to said drain gate during the transfer period to discharge accumulated charges in said photosensitive units, wherein said read-out period and said transfer period each having a fixed value, and the timing of said shutter pulse is changeable depending upon the output level of each image pickup signal from said CCD solid-state image pickup element.

2. The CCD solid-state image pickup device as claimed in claim 1, wherein said shutter-timing generating unit includes a programmable counter for outputting the shutter pulse when counting a predetermined value.

3. The CCD solid-state image pickup device as claimed in claim 2, wherein a value in said counter is set to one higher than the predetermined value when the comparison signal indicates that the luminosity of a light source is higher, while the value is set to one lower than the predetermined value when the comparison signal indicates that the luminosity of the light source is lower.

4. The CCD solid-state image pickup device as claimed in claim 1, wherein said CCD solid-state image pickup device comprises a linear sensor.

5. The CCD solid-state image pickup device as claimed in claim 1, wherein each of said photosensitive units comprises a photodiode.

* * * * *